Jan. 21, 1964     D. D. PETTIGREW     3,118,325
COMBINED MANUAL AND POWER FEED FOR DRILL PRESS
Filed April 12, 1960     4 Sheets-Sheet 1

INVENTOR
David D. Pettigrew

BY *Strauch, Nolan & Neale*

ATTORNEYS

Jan. 21, 1964  D. D. PETTIGREW  3,118,325
COMBINED MANUAL AND POWER FEED FOR DRILL PRESS
Filed April 12, 1960  4 Sheets-Sheet 3

INVENTOR
David D. Pettigrew

BY *Strauch, Nolan & Neale*
ATTORNEYS

INVENTOR
David D. Pettigrew

BY
ATTORNEYS

United States Patent Office 3,118,325
Patented Jan. 21, 1964

3,118,325
COMBINED MANUAL AND POWER FEED FOR DRILL PRESS
David D. Pettigrew, Pittsburgh, Pa., assignor to Rockwell Manufacturing Company, Pittsburgh, Pa., a corporation of Pennsylvania
Filed Apr. 12, 1960, Ser. No. 21,784
1 Claim. (Cl. 77—32.1)

This invention relates to improvements in machine tools and more particularly to improved combined manual and power feed devices for drill presses.

Experience has shown that a high degree of accuracy in drilling can be achieved only if the drill is power fed into the work at a carefully predetermined uniform rate. However it is also desirable to provide for manual control of the drill spindle position to permit the drill to be withdrawn rapidly at the end of a drilling operation and to be returned rapidly to the surface of the work for the next drilling operation.

In the past it has been proposed to provide a single control element by which the drill spindle may be fed manually and by which the power feed may be selectively engaged. However, these prior proposals have involved complicated structures which are expensive and which often require excessive maintenance to assure their continued proper operation.

It is accordingly the principal purpose and object of the present invention to provide improved feed mechanisms for a machine tool, and in particular a drill press, of simplified, rugged construction in which the drill may be fed manually by a single readily accessible lever which also functions to selectively engage and disengage a power feed at any desired point in the cycle.

It is a further object of the present invention to provide improved drill feed mechanisms in which a single control lever accessible from the front of the drill is effective in one position to feed the drill spindle manually and in another position to engage a power feed for the spindle and in which the control lever is locked in its second position with a novel, quickly releasable positive lock mechanism.

It is an additional object of the present invention to provide an improved clutch control mechanism for selectively engaging a power feed mechanism for a drill spindle in which the reaction forces exerted by the opposite faces of the clutch element are absorbed entirely within the control mechanism.

It is also an object of the present invention to provide an improved combined manual and power feed for machine tools in which the maximum torque exerted by the power feed can be regulated within wide limits by a single externally accessible adjustment.

It is an additional object of the present invention to provide an improved combined manual and power feed for machine tools in which the control lever for the manual drill feed is also effective to engage and disengage the power feed and in which the power feed is automatically disengaged at the end of the predetermined stroke.

Additional objects and advantages of the present invention will become apparent as the description proceeds in connection with the accompanying drawings in which.

Figure 1:
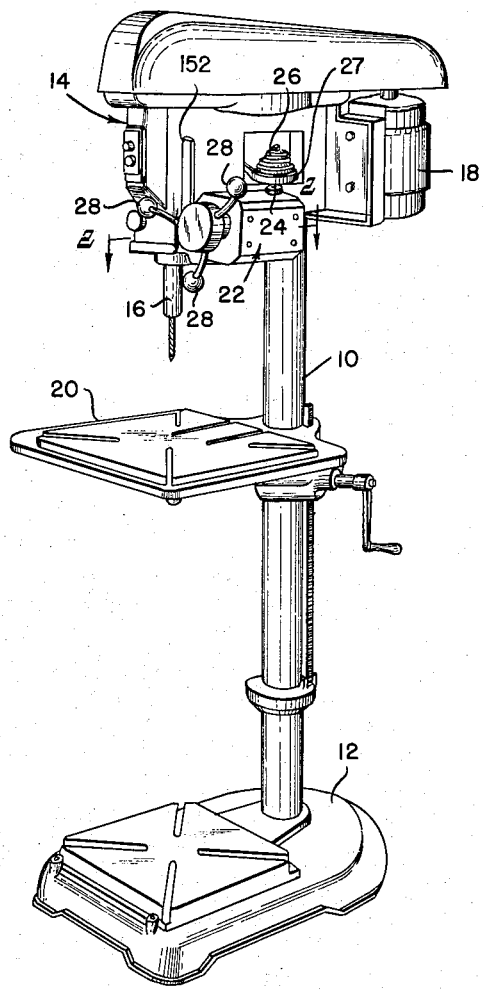
FIGURE 1 is a perspective view of a complete drill press incorporating the present invention.

The drill press shown in FIGURE 1 is conventional in all respects except for the drill control unit of the present invention. The drill press includes an upright column 10, the lower end of which is mounted on a conventional base 12 and on the upper end of which is mounted the drill assembly 14 having a vertically reciprocable drill spindle driven through a belt drive (not shown) by a rear mounted electric motor 18. The usual work stand 20 is adjustably mounted on the column 10 beneath the spindle 16.

The feed control unit of the present invention, which is indicated generally at 22, is mounted at the side of the main drill unit 14 and extends generally from the front to the rear thereof. As will be explained in detail, power is supplied to the input shaft 24 of the unit 22 through a pulley 26 carried by the shaft and driven by a belt 27 which is in turn driven by the spindle drive motor 18. As will be explained in detail, the three control knobs 28, which are positioned within easy reach of the operator at the forward end of the unit 22, may be used to raise or lower the spindle 16 manually, or to selectively connect the power driven input shaft 24 to the spindle to establish a power feed.

Figure 2:
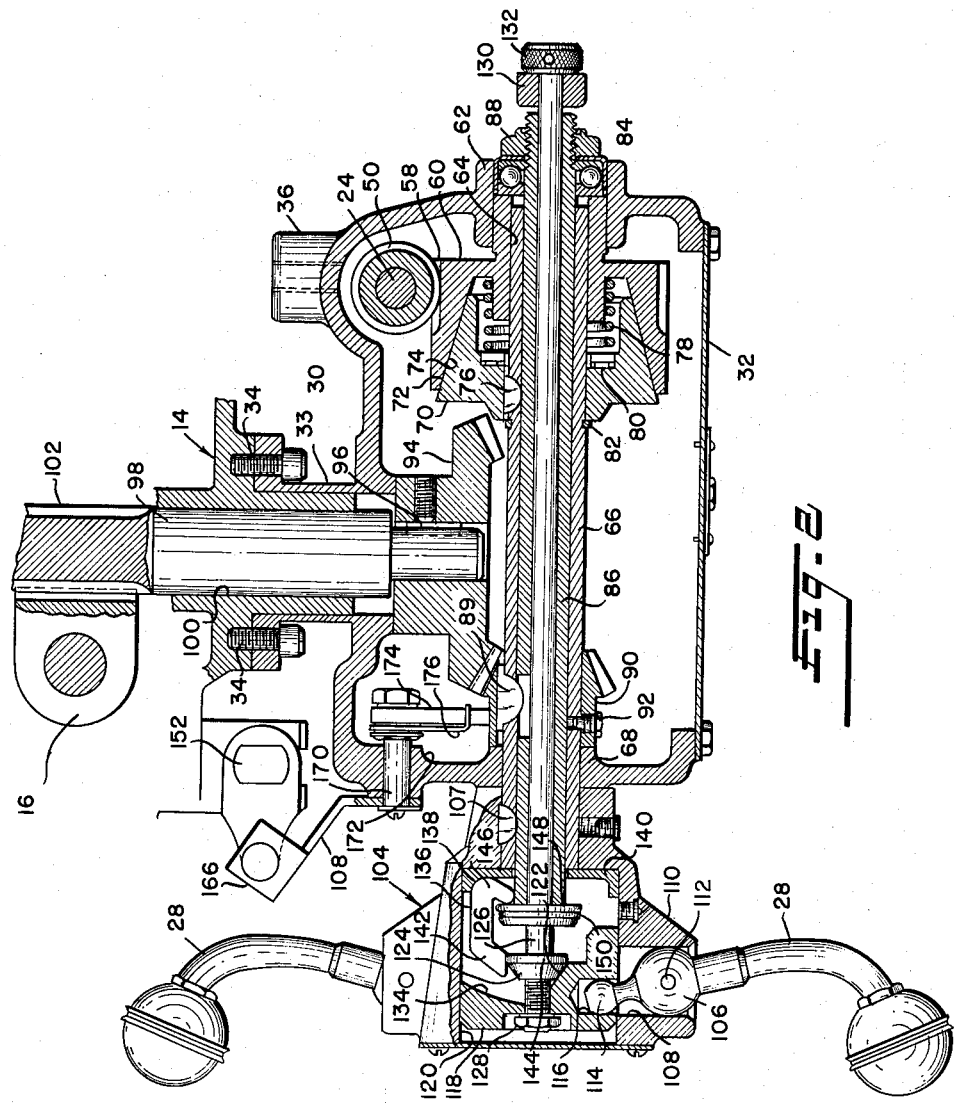
FIGURE 2 is a central horizontal section through the control unit of the present invention taken along line 2—2 of FIGURE 1.
Figure 3:
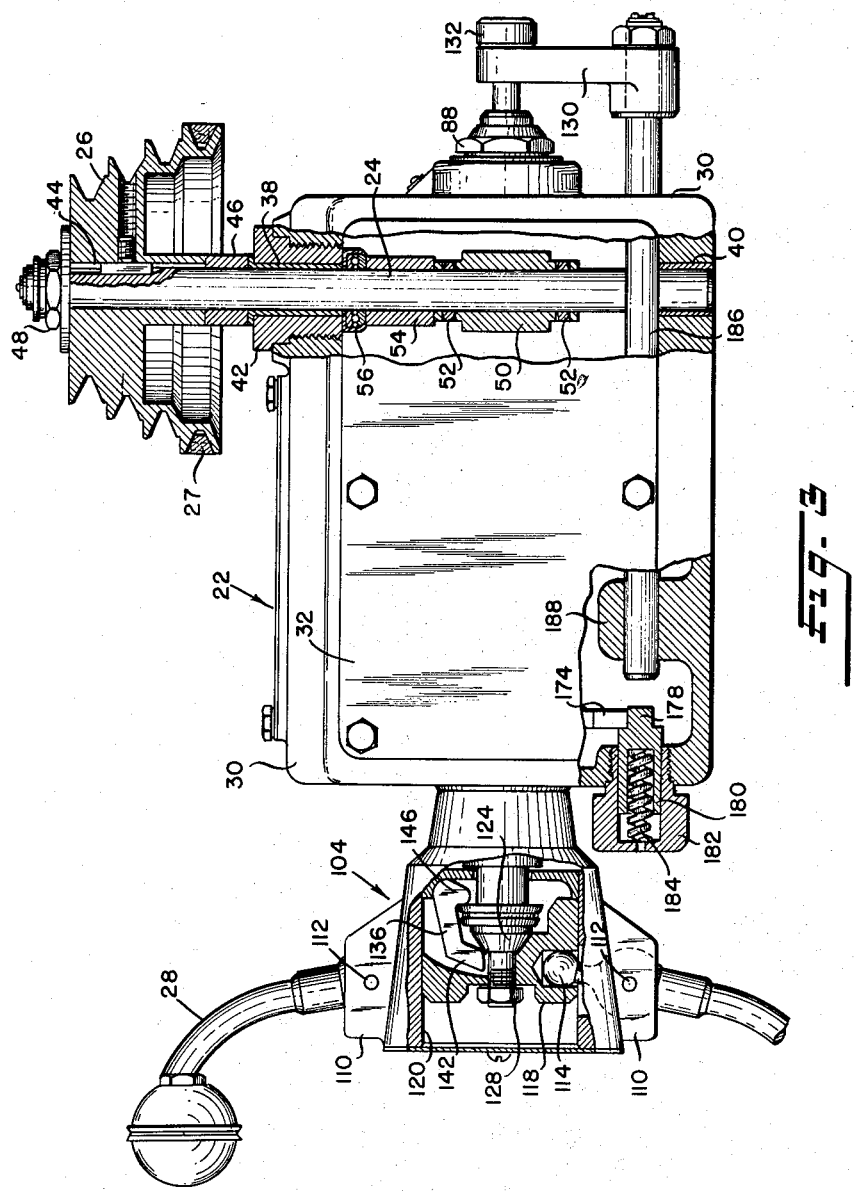
FIGURE 3 is a side elevation of the control apparatus with the parts broken away to show interior details.
Figure 4:
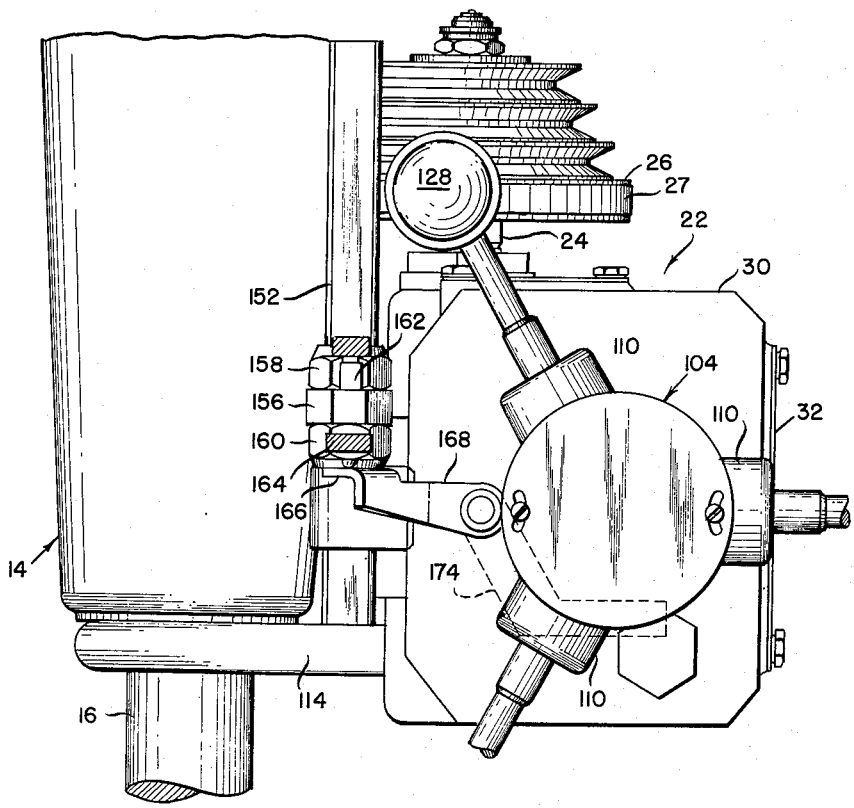
FIGURE 4 is a front view of the control unit of FIGURES 2 and 3.

Referring now more particularly to FIGURES 2, 3 and 4, the control assembly 22 is enclosed in a shell-like cast housing 30 provided with an access plate 32 on its outer side. The housing 30 is provided with a cylindrical neck portion 33 by which it is attached to the housing of the main assembly 14 by screws 34. Torsional stress on the neck portion 33 is minimized by a boss 36 which is fastened to a projection (not shown) formed on the housing of the main assembly 14.

The input shaft 24 is rotatably mounted in bushings 38 and 40, the former being mounted in a fitting 42 threaded into the upper portion of the housing 30 and the latter being received with a press-fit in an aligned opening in the lower portion of the housing. Pulley 26 is non-rotatably mounted on the upper end of the shaft 24 by a groove and key construction 44 and is retained against a spacer 46 by a nut 48. A worm gear 50 is non-rotatably secured to the shaft 24 by pins 52 below a spacer 54 and a bearing assembly 56. The worm 50 is in driving engagement with gear teeth 58 formed on the periphery of a clutch element 60 mounted for rotation and for axial movement in a bearing boss 62 formed on the end of housing 30. A smoothly finished inner through bore 64 of the clutch element 60 rotatably supports one end of an elongated tubular intermediate drive shaft 66, the opposite end of which is supported for rotation in a bearing boss 68 formed at the opposite end of the housing 30.

A second clutch element 70 having conical clutch face 72 opposite the clutch face 74 of the clutch element 60 is non-rotatably secured to the shaft 66 by a Woodruff key 76. The clutch elements are normally urged apart by a spring 78, one end of which bears against a thrust bearing 80 carried by the clutch element 70. Movement of the clutch element 70 to the left is limited by a snap ring 82 mounted on the shaft 66. Movement of the clutch element 60 to the right is limited by a movable abutment comprising a thrust bearing assembly 84 adjustably positioned by a nut 88 on an inner tubular clutch control shaft 86 which extends through the shaft 66. The shafts 66 and 86 are non-rotatably secured together by a Woodruff key 89 carried by a bevel gear 90 supported on the outer shaft 66 and locked against axial movement by a screw 92. The bevel gear 90 is in driving engagement with a bevel gear 94 non-rotatably secured by a key 96 to the inner end of a power output shaft 98 rotatably supported on a bearing boss 100 formed integrally with the main drill assembly 14. The projecting end of the shaft 98 is provided with gear teeth 102 which engage a rack formed integrally with the housing of the spindle 16. Thus rotation of the shaft 98 in one direction or the other raises or lowers the spindle and the drill.

A hub assembly 104, which carries the three control knobs 28, is mounted on the projecting end of the tubular shaft 66 and is secured to the shaft by a key 107. The control levers 28 are provided with ball portions 106 which are received in respective radial bores 108 formed in bosses 110 on the hub, the levers being pivotally mounted on pins 112 carried by the respective bosses 110. Ball portions 114 on the inner ends of the control levers 28 extend into radial bores 116 formed in an inner hub unit 118 mounted for limited axial movement in a central bore 120 in the main hub assembly. Accordingly, when any one of the control levers 28 is pivoted, the inner hub unit 118 is moved axially within the bore 120 also pivoting the other control elements. The inner side of the inner hub 118 has a conical socket 122 in which a conical cam 124 on a clutch release shaft 126 is received. The outer end of shaft 126 projects through an opening in the hub and is held in place by a nut 128. The shaft 126 extends through the tubular inner shaft 86 and through an opening formed adjacent one end of the lever 130 which normally bears against the retainer 132 carried by the end of the shaft 126. Lever 130 is associated with the automatic release mechanism to be explained below.

The inner hub unit 118 is provided with six equally spaced radial slots 134 (one shown) in which U-shaped finger plates 136 are loosely received. The arcuate corners 138 of the plates bear against mating arcuate support surfaces formed in an annular support member 140 which bears against the inner end of the recess 120 in the hub assembly 104. The inner end of the forward locking fingers 142 on the locking plates 136 bears against either the conical surface 124 as shown in FIGURE 3 or against a cylindrical land 144 as shown in FIGURE 2 depending upon the position of the parts. Another finger 146 on the locking plate 136 bears against the rearward surface of a collar 148 secured by threads to the end of shaft 86 and locked by a snap ring 150.

When the parts are in the position of FIGURE 3, that is with the control arms 28 in their forward position, the finger plates 136 are rotated inwardly slightly about the arcuate pivot surface 138. This action rotates the finger 146 slightly toward the right as viewed in FIGURES 2 and 3 and permits the shaft 86 and the associated nut 88 and bearing assembly 84 to move slightly to the right, under the influence of the spring 78. This movement is sufficient to separate the clutch faces 72 and 74 and interrupt the transmission of the driving force between the input shaft 24 and the shaft 66. However the control arms 28 and the hub assembly 104 are at all times connected to the shaft 66 so that rotation of the control arms in either direction rotates the gears 90 and 94 to rotate the output shaft 98 and raise or lower the spindle as desired.

At any time the power feed may be connected by moving any one of the control levers 28 rearwardly to the position shown in FIGURE 2. As the levers 28 are moved from the position of FIGURE 3 to the position of FIGURE 2, the inner hub assembly 118 is shifted to the left to the position of FIGURE 2 causing the inner surface of the finger 142 to ride up along the conical cam surface 124. At the conclusion of this movement the flat inner surface of the finger 142 is disposed on the cylindrical land 144 to thereby lock the finger plates 136 in the position of FIGURE 2. As the finger plates 136 are rotated from the position of FIGURE 3 to the position of FIGURE 2, the end of finger 146 is moved slightly to the left as viewed in FIGURE 2 thus urging the shaft 86 together with the nut 88 and the bearing assembly 84 to the left to overcome the resistance of the spring 78 and move the clutch faces 72 and 74 into driving contact. Thereafter rotation of the input shaft 24 is transmitted through the clutch to the shaft 66 thence through the gears 90 and 94 to the output shaft 98 to thereby move the spindle 16. It will be understood that the drive arrangement is such that the input shaft 24 is rotated in such a direction as to move the spindle 16 vertically downward.

The torque transmitted through the clutch can be regulated by adjustment of the nut 88 which is readily accessible from the rear of the control unit. For example, to increase the slip torque of the clutch it is necessary to tighten the nut 88 and to decrease the torque the nut 88 is loosened slightly.

The loads developed in the apparatus by the forces necessary to produce engagement between the clutch surfaces 72 and 74 are absorbed entirely by the two shafts 66 and 86 and the mechanism associated therewith. For example, the engagement of the clutch tends to move the clutch elements to the left against the snap ring 82. This force is transmitted through the shaft 66 and the finger plate 136 to the collar 148 thence to the shaft 86 to the nut 84 and back to the opposite clutch member 60. Thus none of the load developed to effect engagement of the clutch is transmitted to or beyond the housing 30.

The invention also provides for automatic disengagement of the power feed when the drill has reached a predetermined depth. This mechanism is actuated by the usual depth gage conventionally provided with drill presses of this type. Referring to FIGURE 4, the depth gage includes a threaded rod 152 carried by clamp 154 rigidly secured to the spindle housing 16. A stop member 156 is adjustably positioned on the rod 152 by nuts 158 and 160, threaded on the rod 152 above and below the stop member 156. To provide a vernier adjustment, the stop member 156 carries a screw 162 which is locked in adjusted position by lock nut 164 to dispose the lower end of the screw in the desired precise relation with the lower end of the drill.

Disposed in the path of the lower end of the adjusting screw 162 is a horizontal portion 166 of a lever 168 supported on the outer end of a shaft 170 rotatably supported in a bearing boss 172 in the front wall of the control unit housing 30. As shown in FIGURE 2, non-rotatably secured to the inner end of shaft 170 is a lever 174 which extends downwardly and beneath shafts 86 and 66. A light spring 176 biases the assembly comprising the shaft 170 and the levers 168 and 174 in a clockwise direction as viewed in FIGURE 4 to maintain the lower end of lever 174 in engagement with reduced end portion 178 (FIGURE 3) of a plunger 180 slidably received in a retainer 182 adjustably threaded into the forward wall of the control unit housing 30. A compression spring 184 constantly urges the plunger 180 to the right, as viewed in FIGURE 3, against the side surface of the lever 174. A shaft 186 is mounted for axial movement in aligned bores formed in an internal boss 188 and in the end wall of the housing 30, in alignment with the plunger 180. At its outer end the shaft 186 carries the arm 130, the opposite end of which loosely surrounds the shaft 126 inwardly of the retainer nut 132. Assuming that the power feed is in operation to lower the drill and that the lever 174 and plunger 180 occupy the position of FIGURE 3, when the end of the screw 162 contacts the arm 168, the lever 174 will be rotated out of contact with the plunger 180 to permit the plunger to advance against the end of the shaft 186. This action will cause the shaft 186 to move to the right, carrying the arm 130 and displacing the shaft 126 to the right as viewed in FIGURE 2 moving the land 144 out of register with the finger 142. The combined action of springs 184 and 78 will produce substantially instantaneous disengagement of the power feed clutch. The spindle will then retract fully under the influence of the usual drill press retracting spring not shown.

To perform the next drilling operation the spindle will be lowered by manual rotation of the control arms 28 until the drill is closely adjacent to the work. The operator then moves one of the control arms to the rear, that is, to the position of FIGURE 2 to again engage the power feed. This movement of the levers 28 displaces the shaft 186 to the left to restore plunger 180 to the position shown in FIGURE 3 and the spring 176 returns the lever 174 to the retaining position shown in FIGURE 3.

Thus it will be seen that the objects of the invention have been attained by the provision of an improved combined manual and power feed control which combines simplicity of structure, ease of operation and ease of adjustment to an extent not heretofore attained by the devices of the prior art.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

Feed mechanism for a drill press having a reciprocable quill comprising a hollow intermediate drive shaft, means drivingly connecting said drive shaft to said quill, a friction clutch assembly having one element drivingly connected to said drive shaft and a second element mounted for free rotation and axial movement on said drive shaft, means connecting said second element to a power source, a hub drivingly connected to said drive shaft, resilient means urging said friction clutch elements apart, a control lever mounted in said hub, a movable abutment for moving said second element into driving engagement with said first element against the resistance of said resilient means, a clutch control shaft extending through said drive shaft and connected to said abutment, means in said hub connecting said lever to said clutch control shaft whereby the engagement of said clutch is controlled by said lever, said last-mentioned means including locking means for positively retaining said clutch elements in driving engagement against the resistance of said resilient means and means for adjusting the position of said abutment with respect to said clutch control shaft to thereby adjust the force with which said elements are urged together.

References Cited in the file of this patent

UNITED STATES PATENTS

| | | |
|---|---|---|
| 284,731 | Gibbins | Sept. 11, 1883 |
| 1,638,654 | Carlton | Aug. 9, 1927 |
| 2,323,488 | Schauer | July 6, 1943 |
| 2,401,276 | Schauer et al. | May 28, 1946 |

FOREIGN PATENTS

| | | |
|---|---|---|
| 34,283 | Sweden | Jan. 29, 1913 |
| 543,878 | Great Britain | Mar. 17, 1942 |